Patented June 20, 1939

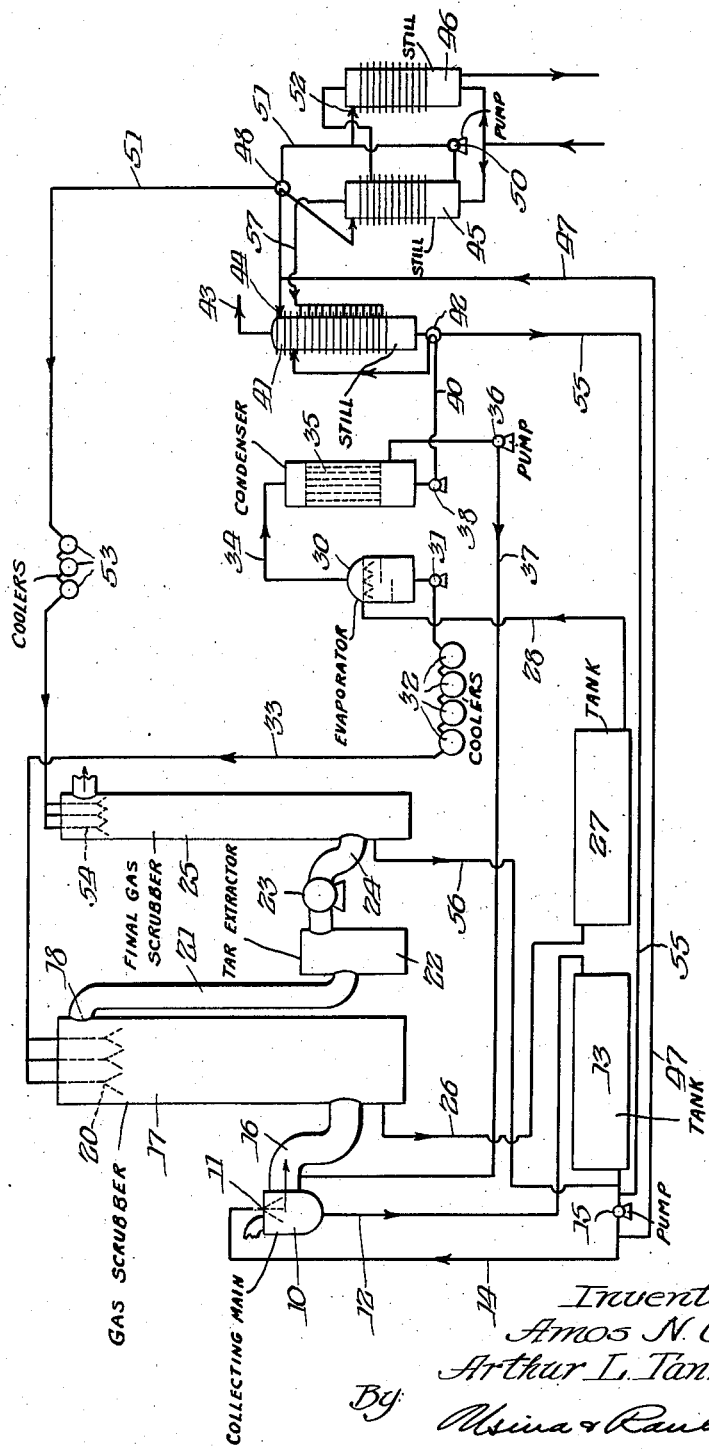

2,162,838

UNITED STATES PATENT OFFICE 2,162,838

PROCESS FOR PURIFICATION OF GASES

Amos N. Cole and Arthur L. Tannehill, Gary, Ind.

Application April 6, 1936, Serial No. 73,004

5 Claims. (Cl. 23—3)

The process relates to the purification of coal gas, coke oven gas and the like and to the recovery of by-products such as ammonia, hydrocyanic acid, hydrogen sulphide and more particularly to the simultaneous recovery of hydrogen sulphide and ammonia.

Coal gas or coke oven gas, when produced, contains considerable amounts of ammonia and hydrogen sulphide with smaller quantities of hydrocyanic acid. Ammonia ($NH_3$) is nearly always recovered but hydrogen sulphide ($H_2S$) is generally recovered only when absolutely necessary, because no really economical process has been discovered. Hydrocyanic acid (HCN) is seldom recovered except where its recovery is incidental to that of the other two.

An object of the present invention is to provide a process for economically recovering both ammonia and hydrogen sulphide or sulphur.

A further object is to purify gas at low cost, thus making it possible to purify gases used for steel making and other purposes where a low sulphur content is desirable and advantageous although not imperative.

Ammonia is almost universally recovered from coal gas by one of two processes:

1. "Indirect process", in which, after first cooling the raw gas and more or less completely freeing it of tar vapors, the gas is scrubbed with water to absorb the ammonia, after which the ammonia is expelled from the scrubbing solution by distillation with steam in a column still. The ammonia is customarily recovered in this process as crude concentrated ammonia liquor, aqua ammonia, anhydrous ammonia, or as ammonium sulphate when the still gas is passed through a saturator and ammonia is absorbed in sulphuric acid.

2. In the "semi-direct process", after cooling the raw coal gas and freeing it more or less completely of tar vapors, the gas is passed directly through a saturator, where the ammonia in the gas unites with the sulphuric acid in the bath forming ammonium sulphate.

During recent years, the production of ammonia by chemical synthesis from atmospheric nitrogen has developed on an immense scale and competition from this source has forced the price of ammonia down to a level which hardly pays the cost of its recovery from coal gas at the majority of by-product coke plants.

Numerous processes have been devised for removing hydrogen sulphide from these gases, but so far, while many are satisfactory where desulphurization is absolutely necessary, such as desulphurization of town gas, none have proven commercially profitable from the standpoint of the value of the recovered sulphur. The reasons for this are many but the principal reason is that they all endeavor to treat the whole volume of raw gas, necessitating much equipment and high power or steam consumption. Some processes only attempt desulphurization or sulphur removal while other recover sulphur to help pay the cost of treatment. The principal obstacle to economical sulphur recovery is the very great dilution of the sulphur by the gas. Many of the present methods could be well applied if the sulphur or hydrogen sulphide were first separated from the gas so that a concentrated form of hydrogen sulphide could be dealt with.

The process of this invention, as applied to coke oven gas or coal gas, aims at separating ammonia, hydrogen sulphide and hydrocyanic acid from the gas. Thus separated, these constituents may be easily and cheaply converted into marketable forms by well known processes.

As generally produced in retorts, coke ovens, and the like, the hot gas is sprayed with water or solution of weak ammoniacal liquor as it leaves the retort. This treatment lowers the temperature of the gas to approximately that of adiabatic saturation (about 75° C.) and precipitates most of the tar. The gas is then drawn through a cooler, either of the indirect tubular form or the direct cooler, where the gas is cooled with cooled ammoniacal liquor flowing counter current to the gas, thence through a tar extractor whence it is passed through apparatus for the recovery of ammonia. If the so-called semi-direct ammonia process is used, the gas leaving the saturator, being quite hot, due to compression and to the heat of reaction, is then cooled in a direct cooler.

The present invention contemplates the use of much of the present equipment, more especially the primary direct cooler and the final direct cooler, which feature is favorable from the cost stand-point. However, the necessity of pumping the large volume of gas through the high resistance offered by the saturator is avoided, thereby saving a large part of the cost of pumping the gas. One of the principal advantages of this new process is the low most of heat energy required for distillating and separating the ammonia and hydrogen sulphide from the gas, avoiding, as it does, the use of much expensive steam generated in a boiler plant.

It has been discovered that in processes for the removal of gaseous components from gas by scrubbing with an aqueous absorbing liquid, there is a great advantage in evolving the absorbed components by evaporation under partial vacuum. By so doing the heat required for evaporation may be supplied at low temperature, thus making it possible to use what is otherwise waste heat and the evolved constituents can be recovered. This process contemplates the use of the heat in the raw gas. A suitable method for making this heat available is "flash" distillation, whereby the sensible heat of the liquor used to scrub the gas furnishes the latent heat of evaporation.

Common methods of evolving the absorbed components are evaporation in a current of air and distillation with open steam. The disadvantage of the first method is that the products can not be recovered and that oxidation of the absorbed components is sometimes detrimental, as for instance, in the "seaboard process" of desulphurizing coal gas where oxidation destroys the reagent. The second method is expensive.

It has also been found that a hot gas may be scrubbed and cooled in one operation and that the heat abstracted from the gas and absorbed by the liquid may be utilized for evaporation to evolve the absorbed components, as by subjecting the heated liquid to "flash" distillation.

A further discovery is that ammonia, hydrogen sulphide and hydrocyanic acid may be simultaneously recovered from hot coal gas while cooling the gas in the same operation, by scrubbing the hot gas with a cool aqueous solution and subjecting the heated scrubbing solution to distillation at a low temperature and pressure. In this application of the process there is a peculiar advantage in low temperature distillation. Coal gas contains more $CO_2$ than $H_2S$ and the $CO_2$ as well as the $H_2S$ and the HCN combines with ammonia to form soluble salts in the scrubbing solution. In the distillation of this solution at low temperature the $CO_2$ is evolved to only a small extent while the $H_2S$ and HCN are nearly all evolved. Lower temperatures diminish the volatility of $CO_2$, while higher temperatures increase it. The scrubbing liquid, after distillation at low temperature contains a considerable amount of ammonium carbonate, which greatly improves the power of the liquid to absorb $H_2S$ and HCN, without giving to the liquid much tension of $NH_3$. In the low temperature distillation most of the $NH_3$ in excess of that required to form normal carbonate with the $CO_2$ is volatilized. Thus the scrubbing liquid after distillation consists largely of a dilute solution of ammonium carbonate, having a low tension of $H_2S$ and $NH_3$ and therefore a good absorbent for these compounds. It is, however, a poor absorbent for $CO_2$, which is a great advantage. It is desired to leave the $CO_2$ in the gas, since the removal of $CO_2$ requires the recirculation of additional ammonia.

Thus by distilling the scrubbing liquid at a low temperature a solution is obtained which is selective for removing $NH_3$, HCN and $H_2S$ from the gas in the presence of $CO_2$. If the distillation is made at a high temperature, as has been the case where the simultaneous recovery of hydrogen sulphide and ammonia has been attempted heretofore, all of the $CO_2$ must be removed along with the $H_2S$ and a very large amount of ammonia must be recirculated.

By this process, as applied to hot gas containing hydrogen sulphide and ammonia, such as coke oven gas, the gas may be scrubbed and cooled in one operation, controlling the volume and temperature of the scrubbing-cooling liquid and using a scrubber of suitable size to give the desired temperature in the liquid as it leaves the scrubber, preferably 60° to 72° C. Proper temperature is necessary here in order to obtain a high absorption of constituents and in order to carry out the succeeding steps. If the temperature is too high absorption will not be sufficiently complete and if too low not enough heat will be available for thorough distillation. The scrubbing liquid from the scrubber-cooler is distilled under reduced pressure. This may be done in various ways. One method, preferred from the standpoint of simplicity, is to continuously run the liquid at about 66° C. into a chamber which is maintained under a vacuum of about twenty-six inches of mercury. The chamber, which preferably contains baffles or grids to provide surface, is connected to a condenser. When the liquid enters the chamber a certain amount, about 3%, at once flashes into vapor, at the same instant dropping the temperature of the liquid to about 50° C. or below. Obviously, this method of evaporation may be extended by using a second evaporating chamber at higher vacuum in order to more thoroughly evaporate the absorbed constituents and to thoroughly cool the liquid. Another method, employing the counter-current principle, would be to boil the liquid in the base of a packed tower by means of heat exchange with the incoming hot scrubbing liquid, spraying the scrubbing liquid in at the top of the tower.

The vapors from the evaporator, containing $H_2S$, HCN and $NH_3$ are conducted to a condenser, preferably of the tall vertical tube type, where the vapors are condensed. The vertical tube type of condenser is advantageous in that it is not easily stopped by solid hydrocarbons.

The condensate is then treated for the separation of excess ammonia or ammonia in excess of that produced by the coal which must be returned to the system. A suitable method is to evaporate the acidic gases along with the proper amount of ammonia in a vaporizing column. This is an apparatus which has long been used for expelling hydrogen sulphide and carbon dioxide from ammonia liquor. The column is heated and is supplied with a refluxing liquid at the top to help hold back excess ammonia. By controlling the volume of reflux and the application of heat, hydrogen sulphide and ammonia may be expelled in any proportion desired even up to practically all hydrogen sulphide. The residual liquid from the column is then run back to the gas main where the ammonia is evaporated and is again absorbed by the scrubbing liquid.

A feature of this invention is the manner of circulating the scrubbing liquids so as to obtain substantially complete removal of hydrogen sulphide and ammonia from the gas. This is accomplished by a final scrubbing of the gas in a second scrubber with a solution or liquid having little or no vapor pressure with respect to the components sought to recover, thus obtaining substantially complete absorption, and returning the absorbed components to the gas before it enters the washer-cooler. The partial pressure of the absorbed components in the gas and consequently the solubility of the same components in the washer-cooler liquid is thereby increased. Liquid from the second scrubber can also be added to that of the first scrubber. A second scrubber is necessary only when very thorough removal of ammonia and hydrogen sulphide from the gas is required.

The drawing illustrates diagrammatically a preferred arrangement of apparatus for refining and purifying coal gas, coke oven gas and the like in accordance with the present invention.

Numeral 10 represents a collecting main for a battery of coke ovens. Flushing liquor is sprayed at 11 into the gas in the collecting main, the flushing liquor flowing through pipe 12 to tank 13 where the tar is drawn off. Pipe 14 connects with the other end of the tank and includes a pump 15 which withdraws the liquid from the tank and pumps the same back to the spray 11. The gas temperature in the collecting main is thereby reduced to about 75° C., although little or no heat has been abstracted from the gas. The gas from the main 10 flows through conduit 16 to the water-cooler 17, where the gas is cooled to about atmospheric temperature by the time it reaches the outlet 18. The cooling liquid sprayed into the cooler 17 by the sprays 20 flows downwardly over grids in contact with the gas and abstracts the heat from the gas. In so doing the liquid is heated close to the temperature of the entering gas. This scrubbing-cooling liquid having been greatly reduced in its content of hydrogen sulphide and ammonia by prior treatment will absorb a large part of the hydrogen sulphide and ammonia contained in the gas. The gas passes from outlet 18 to conduit 21, which connects with a tar extractor 22 from which the gas flows to an exhauster 23 and is finally delivered by conduit 24 to a final scrubber-cooler 25, where the remaining ammonia and hydrogen sulphide are absorbed.

The hot liquid from the washer-cooler 17 is delivered by pipe 26 to a tank 27 where the tar is separated and is then conducted by pipe 28 to a tower or evaporating chamber 30, which is maintained under a pressure of about 3.5 inches of mercury absolute or a vacuum of about twenty-six inches of mercury. In this chamber flash evaporation of about 3% of the liquid occurs along with a considerable proportion of hydrogen sulphide and ammonia. The remaining liquid is then pumped out of chamber 30 by pump 31 and is delivered to coolers 32 from which the liquid is returned through pipe 33 to the sprays 20 in the top of washer-cooler 17. The vapors evolved in chamber 30 are delivered by pipe 34 to a condenser 35 and are substantially all condensed. The small amount of vapor and gas that may pass through the condenser are returned by pump 36 through pipe 37 to the conduit 16. The condensate obtained from the condenser 35 is pumped by pump 38 through pipe 40 to still 41, the pipe 40 having association with the heat exchanger 42, whereby the condensate is heated by liquor leaving the still 41. In this apparatus hydrogen sulphide, hydrogen-cyanide and a small amount of carbon dioxide are distilled out along with the desired and proper amount of ammonia and are delivered at 43. The ratio of ammonia to hydrogen sulphide in the gas expelled is regulated by the application of heat and by the volume of refluxing liquid fed at 44, the refluxing liquid holding back ammonia which is in excess in the liquor entering the still. Heat is furnished for the still by steam previously used on the stripping stills 45 and 46.

Some of the flushing liquor delivered by pump 15 is pumped to still 46 through pipe 47 which has association with heat exchanger 48. The liquor from still 46 is drawn off by pump 50, having connection with pipe 51 which includes the heat exchanger 48. Part of the liquor flowing through pipe 51 is delivered to still 46 at 52, the amount substantially equaling the water derived from the coal and which is limed and distilled in 46 in the usual manner, the residue running to waste. The pipe 51 delivers the remainder of the liquor to coolers 53 and finally to the cooler-scrubber 25, where the same is sprayed through sprayers 54 in the top of the cooler-scrubber. The liquor serves to remove the remaining ammonia and hydrogen sulphide in the gas. The liquor from the scrubber is delivered to pump 15 and is accordingly returned to the gas main where the volatile constituents are re-evaporated into the gas. The concentration of ammonia in the gas entering the washer-cooler is thus increased by this liquor as well as by the return liquor from still 41, which is delivered by pipe 55 to pipe 14 in advance of the pump 15. This is an advantage since it increases the solubility of both ammonia and hydrogen sulphide in the washer-cooler liquor. The vapor leaving the top of the still 45 is conducted by pipe 56 and is delivered to still 41 where it serves to evaporate hydrogen sulphide and hydrocyanic acid and ammonia.

The final product secured from still 41 at 43 will be $NH_3$, $H_2S$ and $HCN$ approximately in the proportions in which they exist in the raw gas plus a small variable quantity of $CO_2$. The process can be operated so as to practically exclude $CO_2$ in the final product by distilling the scrubber-cooler liquid at sufficiently low temperature or by redistilling the distillate from the first distillation a second or third time at a lower temperature.

The hydrogen sulphide, ammonia and hydrocyanic acid recovered from the gas may be treated in a number of ways for conversion into finished or marketable products.

Thus the mixture may be passed through a saturator of the conventional type making ammonium sulphate and leaving the hydrogen sulphide to be converted to sulphuric acid. Ammonium sulphate can be made by treatment of the mixed gases in a dry sulphate plant which also leaves the hydrogen sulphide to be converted to sulphuric acid. The hydrogen sulphide may be removed from the mixture by iron oxide or other means with sulphur recovery and the ammonia converted to aqua ammonia, anhydrous ammonia, nitric acid, ammonium nitrate, or ammonium nitrate-ammonia solution.

After separation of ammonia, the hydrogen sulphide can be burned to $SO_2$, either in admixture with HCN or after removal of HCN, and the $SO_2$ converted to sulphuric acid by well known methods. Also the hydrogen sulphide can be burned to sulphur in a limited supply of air. Hydrocyanic acid may be removed by absorption in alkaline solution containing sulphur, as thiocyanate.

In the present process, by distilling the scrubbing liquid at a relatively low temperature and by the manner of separating $H_2S$ and the manner of recirculating the ammonia, the $CO_2$ is largely left in the gas. Also, by making the distillation under low pressure, the heat for evaporation is obtained without cost and it is believed that the overall steam consumption for a plant working with this system will be less than one operating on processes now in use. By the process of this invention, about sixty gallons of scrubbing liquid are used to scrub one thousand cubic feet of gas, while by prior methods only about twenty gallons were used; a large volume of scrubbing liquid insures low concentrations of $H_2S$ and $NH_3$ in the scrubbing liquid and therefore a high percentage of removal from the gas.

The present process does not entail high investment costs. On the contrary, very little additional equipment is required as most plants now have a primary direct cooler and a final direct cooler.

While the process of this invention has been described specifically with reference to coke oven gas, it should not be restricted thereto, as many features may be applied to other gases and for the recovery of various other components thereof, such as the recovery or removal of hydrogen sulphide and carbon dioxide from natural gas.

What is claimed is:

1. The process of recovering gaseous components from coke oven gas, coal gas, and the like, which consists in scrubbing the hot gas with a suitable cool scrubbing liquid, controlling the volume of the scrubbing liquid so as to cool the gas and to heat the scrubbing liquid by a substantial amount, subjecting the hot scrubbing liquid to evaporation under a pressure substantially below atmospheric pressure without the application of extraneous heat, thereby utilizing the sensible heat in the liquid for evaporation, collecting the vapors containing the gaseous components to be recovered, cooling the unevaporated scrubbing liquid and returning the same to the scrubber.

2. The process of recovering ammonia and sulphide gases from coke oven gas, coal gas and the like, which consists in scrubbing the hot gas with a weak ammonia liquor in a suitable scrubber, controlling the volume of the ammonia liquor so as to cool the gas and heat the liquor by a substantial amount, subjecting the ammonia liquor to distillation under a pressure substantially below atmospheric and at a correspondingly low temperature, whereby a portion of the gaseous components absorbed by the liquor are evaporated, the said distillation under low pressure utilizing only the sensible heat of the liquor to supply the heat for the evaporation, collecting the evolved vapors, condensing the same and distilling in a manner to evolve the sulphide gas and ammonia in about the proportion or ratio in which they exist in the raw gas, and returning the residue of the condensate to the gas in advance of delivering the same to the scrubber.

3. The process of cooling and simultaneously recovering ammonia and sulphide gases from hot coke oven gas, coal gas, and the like, which consists in scrubbing the hot gases with a cool ammonia liquor in a suitable scrubber, whereby the gas is cooled and said liquor is raised to a relatively high temperature, subjecting the heated ammonia liquor to flash evaporation under a pressure substantially less than atmospheric to thereby evolve the gaseous components absorbed by the ammonia liquor, cooling the unevaporated liquor, and returning the same to the scrubber, collecting the evolved vapors, condensing the same, distilling the condensate in such a manner as to separate the sulphide gases and ammonia in about the proportions in which the components exist in the raw gas, collecting the residue of the condensate and returning the same to the hot gas before delivery to the scrubber.

4. The process of recovering ammonia and sulphide gases from coke oven gas, coal gas and the like, which consists in scrubbing the hot gas with a weak ammonia liquor in a suitable scrubber to absorb said gaseous components, scrubbing the gas in a second scrubber with a relatively small volume of a flushing liquor having a very low content of the component or components sought to be recovered, subjecting the ammonia liquor to flash evaporation under a pressure substantially below atmospheric and at a correspondingly low temperature to thereby evaporate the absorbed gaseous components, returning the unevaporated ammonia liquor to the first mentioned scrubber, condensing the evolved vapors, distilling the condensate to recover the said ammonia and sulphide gases, and treating a part of the residue of the condensate to produce the said flushing liquor.

5. The process of recovering ammonia and sulphide gases from coke oven gas, coal gas and the like, which consists in scrubbing the hot gas with a weak ammonia liquor in a suitable scrubber to absorb said gaseous components, scrubbing the gas in a second scrubber with a relatively small volume of a scrubbing liquor having a very low content of the component or components sought to be recovered, subjecting the ammonia liquor to flash evaporation under a pressure less than atmospheric thereby evaporating the absorbed gaseous components, collecting the vapors, returning the unevaporated ammonia liquor to the first mentioned scrubber, condensing the evolved vapors, distilling the condensate in such a manner as to evolve ammonia and sulphide gases in about the proportion or ratio in which they exist in the raw gas, and returning the residue of the condensate to the gas before the same is delivered to the first mentioned scrubber.

AMOS N. COLE.
ARTHUR L. TANNEHILL.